Figure 1:
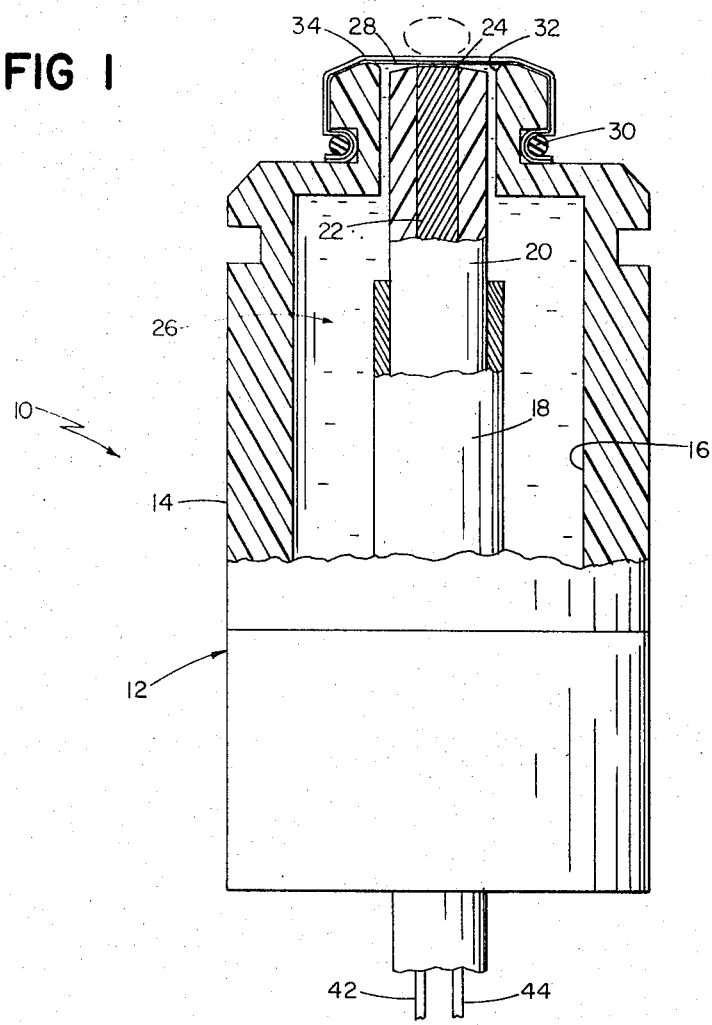

United States Patent [19]
Haddad et al.

[11] 3,847,777

[45] Nov. 12, 1974

[54] ELECTROCHEMICAL ANALYZER

[75] Inventors: Ihsan A. Haddad, Bedford; William M. Krebs, Waltham, both of Mass.

[73] Assignee: Instrumentation Laboratory, Inc., Lexington, Mass.

[22] Filed: May 8, 1972

[21] Appl. No.: 251,287

[52] U.S. Cl............................ 204/195 P, 204/1 T
[51] Int. Cl. ........................................ G01n 27/46
[58] Field of Search..................... 204/1 T, 195 P

[56] References Cited
UNITED STATES PATENTS

| | | | |
|---|---|---|---|
| 3,410,778 | 11/1968 | Krasberg | 204/195 P |
| 3,438,886 | 4/1969 | Ross | 204/195 L |
| 3,655,546 | 4/1972 | Marovich et al. | 204/195 P |
| 3,098,813 | 7/1963 | Beebe et al. | 204/195 P |
| 3,503,861 | 3/1970 | Volpe | 204/195 P |
| 3,574,078 | 4/1971 | Hynes et al. | 204/195 P |

*Primary Examiner*—T. Tung

[57] ABSTRACT

An electrochemical analyzer includes a cathode electrode, an anode electrode, and electrolyte in the space between them. A selectively permeable membrane is disposed over the cathode electrode and in turn is covered by a porous hydrophobic membrane. The porous membrane has a substantially greater area than that of the cathode, and allows substantially unimpeded gaseous flow through it in both the lateral and longitudinal directions.

15 Claims, 2 Drawing Figures

PATENTED NOV 12 1974    3,847,777

ELECTROCHEMICAL ANALYZER

SUMMARY OF INVENTION

This invention relates to electrochemical analyzers of the type used to sense a constituent in a test medium, and more particularly to the type which have generally two electrodes disposed in a chamber that contains an electrolyte and that is typically bounded in part by a membrane that is permeable by the constituent to be sensed but impermeable by other constituents of the test medium or by the electrolyte.

Electrochemical analyzers of this type comprise a sensor which has anode and cathode electrodes which are spaced apart but electrically connected by means of an electrolyte which fills the space between them and which also is held in a thin continuous film covering one end of the cathode. This film is separated from the test medium by a thin selectively permeable membrane which permits a particular constituent of the test medium to pass through to the electrolyte but which prevents other constituents from passing through and which also prevents the electrolyte from passing out of the sensor. While the constituent of interest is absent from the electrolyte, no significant current flows between the electrodes, but while this constituent is present, current flows from the anode through the electrolyte to the cathode. When oxygen is the constituent to be sensed, a membrane such as polytetrafluoroethylene is employed and the oxygen that passes through this membrane to the electrolyte is reduced at the cathode causing a flow of current which is substantially proportional to the amount of oxygen that passes through the membrane. The amount of oxygen that passes through the membrane is proportional to the partial pressure of the oxygen in the fluid or process stream to which the detector probe is exposed, and the partial pressure of the oxygen is generally, although not strictly, representative of the amount of oxygen in the fluid. Thus the intensity of the current is directly related to the concentration of oxygen in the fluid. For the accurate operation of such a cell, it is critically important to maintain an invariant geometric relationship in the path between the test medium and the cathode. In a typical construction, the permeable membrane is fixed relative to the cathode so that only a thin film of electrolyte exists between the membrane and the cathode. In order to help support the membrane and protect it from injury, the permeable membrane is sometimes covered by a screen or by a sheet of elastomeric material.

A serious difficulty is encountered when using such analyzers to measure gas concentration in an atmosphere containing particles of water or a high concentration of water vapor, such as occurs, for instance, in measuring oxygen in a respirator humidifier. In such applications, water particles that come to rest or are formed by condensation on the permeable membrane surface directly over the cathode modify the gaseous flow path between the atmosphere and the cathode, and the response time and/or the calibration of the analyzer are seriously degraded. It is a primary object of this invention to provide an improved electrochemical analysis instrument which is particularly useful in measuring concentrations of constituents of a medium containing either suspended liquid drops or easily condensable vapors or both. Another object is to provide an electrochemical instrument having improved performance in a humid water-drop environment.

In accordance with the invention, there is provided an electrochemical analysis cell comprising a cathode and an anode, an electrolyte in the space between the cathode and anode, and composite membrane structure separating the electrolyte from the test medium. The composite structure includes a selectively permeable layer separated from the cathode by a thin layer of the electrolyte and a second layer that separates the selectively permeable layer from the test medium. The composite structure extends laterally to cover an area substantially larger than the end surface area of the cathode and preferably has a surface area at least 10 times as large as the end surface area of the cathode. The second layer is of hydrophobic material and has a porosity that allows substantially unimpeded gaseous flow in both the lateral and longitudinal directions, that is flow at substantially the same rate as in the test medium itself, and in preferred embodiments is a matrix of hydrophobic fibers that has a pore volume of more than 50 percent and a pore size in the range of 3–60 microns. In a particular embodiment the second layer is a separate membrane from the first layer and is in the form of a matrix of polyfluorocarbon (e.g. Teflon) fibers, which has a pore volume of from 70 to 80 percent and a pore size greater than 5 microns. Its internal geometry comprises intermixed fibers that form channels for gaseous transfer in all directions. The present analyzer when used in environments of high humidity has markedly improved response time and calibration characteristics over prior analyzers.

Figure 2:
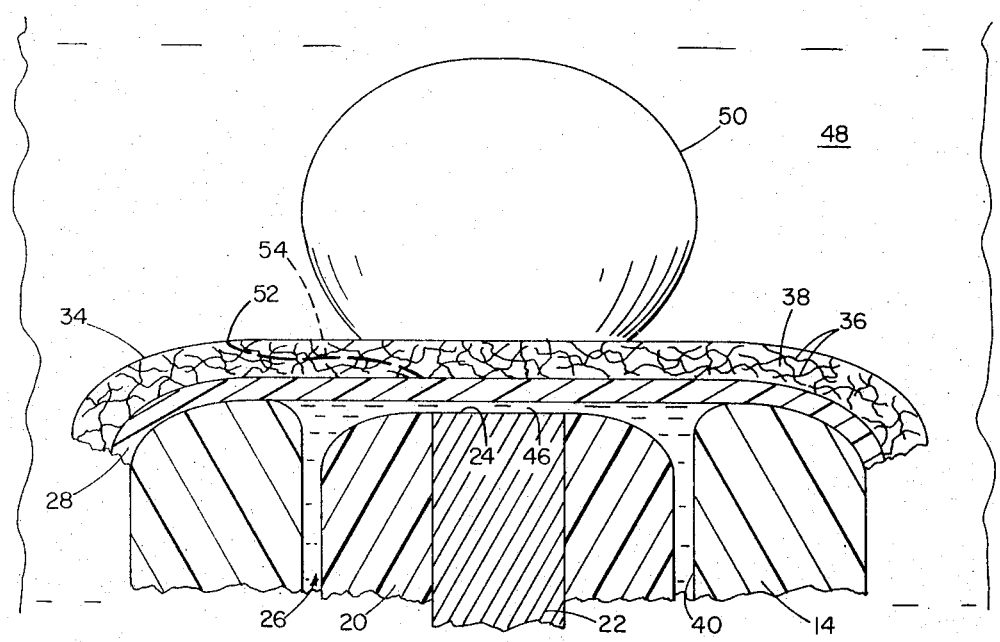

Other objects, features and advantages will appear from the following description of a particular embodiment of the invention taken together with the attached drawings in which:

FIG. 1 shows in partly cut away longitudinal section an improved electrochemical analysis cell according to the invention, together with a test medium in contact with which the cell is disposed and containing a water droplet which is occluding the area directly over the cathode of the cell; and FIG. 2 shows in larger scale a cross-section of the tip of the cell and the water droplet shown in FIG. 1.

DESCRIPTION OF PARTICULAR EMBODIMENT

As shown in FIG. 1, $PO_2$ electrode assembly 10 includes a housing 12 having a cylindrical wall 14 defining an electrolyte chamber 16. Tubular tin anodic electrode 18 is disposed in housing 12 and includes a large surface that extends into electrolyte chamber 16. Cylindrical epoxy envelope 20 extends distally from within anodic electrode 18 and has sealed within it silver cathodic electrode 22 that is about 0.06 inch in diameter. The tip 24 of electrode 22 penetrates the end of envelope 20 and is exposed to electrolyte 26 in electrolyte chamber 16. Selectively permeable membrane 28 of 1 mil polytetrafluoroethylene or similar oxygen permeable material extends across aperture 32 in wall 14. The membrane 28 is permeable to oxygen ($O_2$) but not to contaminants or reducible ions of the sample to be analyzed. Membrane 34, a porous matrix of fluorocarbon polymer fibers, overlies in direct engagement selectively permeable membrane 28 and is held tightly against membrane 28 by O-ring 30 which secures both membranes to housing 12. A suitable membrane material is a TFE membrane material sold by Chemplast Inc.

under the designation H 662-123. The effective area of porous membrane 34 is approximately 25 times as large as the tip area 24 of cathodic electrode 22. Leads 42 and 44 are connected to electrodes 18 and 22, respectively, and are run to conventional power supply and measurement equipment (not shown).

As is shown in FIG. 2, the porous membrane 34 contains numerous interengaged fibers 36 between which are defined open channels 38 which permit gases to flow freely in both the lateral and longitudinal directions that is both parallel to and perpendicular to the interface between membranes 28 and 34. Electrolyte 26 fills electrolyte chamber 16 and passage 40 and form a thin film 46 between selectively permeable membrane 28 and the exposed tip 24 of cathodic electrode 22. The configurations of electrode 22, membranes 28 and 34, and the film 46 of electrolyte 26 may be adjusted as may be advantageous to minimize the effects of temperature, pH, pressure, viscosity and flow pattern of the sample to be analyzed.

In operation, the electrochemical cell is disposed in contact with the test medium 48. Oxygen molecules in the medium 48 flow freely through porous membrane 34 and then diffuse through selectively permeable membrane 28 into the thin film 46 of electrolyte 26 and to the tip 24 of the cathodic electrode 22 where the molecules are reduced, and electric current flows from lead 42 to anodic electrode 18, through electrolyte 26 to cathodic electrode 22 and to lead 44. The magnitude of this current indicates the oxygen concentration in medium 48. Water particles 50 do not penetrate the hydrophobic porous membrane 34. Contaminant gases and ions flow freely into, within, and out of porous membrane 34 but do not penetrate selectively permeable membrane 28. When a water particle such as particle 50 comes to rest or is formed by condensation on the surface of porous membrane 34 directly over the tip 24 of cathodic electrode 22, oxygen molecules enter membrane 34 at points (e.g., point 52) distant from the area over tip 24, travel freely in the lateral direction through the channels 38 in membrane 34 (e.g., along path 54), and then diffuse through selectively permeable membrane 28 directly over the tip 24 of cathodic electrode 22. In prior analyzer cells, such water particles would interfere with the flow of oxygen from the test medium to the electrode, but unless the surface of porous membrane 34 is completely flooded with water, the flow of oxygen into selectively permeable membrane 28 is substantially unaffected by the presence of water particles on the surface over the tip 24 of electrode 22. The analyzer with this composite membrane provides accurate measurements, with rapid response that is not affected by water droplets. The composite membrane tends to prevent a layer from forming on or in the membrane and its high porosity permits the constituent of interest to diffuse to the active electrode from a wide area so that operation is not adversely affected by liquid droplets that occlude a portion of the membrane.

Thus it will be seen that the invention provides a simple and inexpensive means for electrochemically measuring the concentration of a constituent of a test medium in the presence of liquid particles or easily condensable vapors or both. While a particular embodiment of the invention has been shown and described, various modifications therein and other embodiments thereof will occur to those skilled in the art. For example, the hydrophobic layer may be fused to the selectively permeable layer as a single composite structure. Therefore it is not intended that the invention be limited to the described embodiment or to details thereof and departures may be made therefrom within the spirit and scope of the invention as defined in the claims.

What is claimed is:

1. An electrochemical analyzer comprising:
two electrodes spaced apart from each other,
an electrolyte in the space between said electrodes, and a composite membrane structure over the surface of one of said electrodes, said composite structure having a surface area substantially larger than the area of said surface of said electrode and comprising
a selectively permeable layer separated from said electrode surface by a thin layer of said electrolyte,
and a layer of hydrophobic material in overlying engagement with said selectively permeable layer, said layer of hydrophobic material having porosity that allows substantially unimpeded gaseous flow in both the lateral and longitudinal directions.

2. The analyzer of claim 1 wherein the internal structure of said layer of hydrophobic material comprises a matrix of open channels for gaseous transfer in both the lateral and longitudinal directions.

3. The analyzer of claim 1 wherein said layer of hydrophobic material is composed of a multiplicity of interengaged fibers.

4. The analyzer of claim 1 wherein said layer of hydrophobic material has a pore size greater than three microns and a pore volume of more than fifty percent.

5. The analyzer of claim 1 wherein said layer of hydrophobic material has a pore size in the range of three to 60 microns and a pore volume of more than 70 percent.

6. The analyzer of claim 1 wherein said layer of hydrophobic material is composed of polyfluorocarbon fibers.

7. The analyzer of claim 1 wherein said layer of hydrophobic material has a surface area at least 10 times as large as the area of said surface of said one electrode.

8. The analyzer of claim 1 wherein said layer of hydrophobic material comprises a matrix of polyfluorocarbon fibers and has a pore volume of at least 50 percent and its pores have a pore size of at least 3 microns.

9. An electrochemical analysis cell for sensing a gaseous constituent of a test medium comprising:
a housing defining an electrolyte chamber, said housing having an aperture in a wall thereof,
a selectively permeable membrane attached to said housing and covering said aperture,
an electrolyte substance within said chamber,
a cathodic electrode supported within said chamber and separated from said membrane by a thin layer of said electrolyte substance,
an anodic electrode supported within said chamber and spaced apart from the cathodic electrode,
a porous hydrophobic membrane attached to said housing and in overlying engagement with said selectively permeable membrane, said porous hydrophobic membrane having sufficient porosity for allowing substantially unimpeded gaseous flow in both the lateral and longitudinal directions, and having a surface area substantially larger than the area of said cathodic electrode.

10. The analyzer of claim 9 wherein the internal geometry of said porous hydrophobic membrane includes a multiplicity of open channels permitting flow of a constituent of the medium to be analyzed in both lateral and longitudinal directions at a rate comparable to the rate of flow of said constituent in said medium.

11. The analyzer of claim 9 wherein said porous hydrophobic membrane is composed of interengaged fibers.

12. The analyzer of claim 9 wherein said porous hydrophobic membrane has a pore volume of more than fifty percent.

13. The analyzer of claim 9 wherein said porous hydrophobic membrane has a pore size of at least three microns and a pore volume of more than seventy percent.

14. The analyzer of claim 9 wherein said porous hydrophobic membrane is composed of polyfluorocarbon fibers arranged to define a multiplicity of open channels permitting flow of a constituent of the medium to be analyzed in both lateral and longitudinal directions at substantially the same rate of flow as the rate of flow of said constituent in said medium, and to have a pore size of at least three microns.

15. The analyzer of claim 14 wherein said porous hydrophobic membrane has a surface area at least 10 times the area of said cathodic electrode.

* * * * *

UNITED STATES PATENT OFFICE
CERTIFICATE OF CORRECTION

Patent No. 3,847,777    Dated November 12, 1974

Inventor(s) Ihsan A. Haddad and William M. Krebs

It is certified that error appears in the above-identified patent and that said Letters Patent are hereby corrected as shown below:

Below "References Cited" on the cover sheet, insert the following four United States Patents:

```
3,278,408  10/66  Leonard et al.  204/195 P
3,718,563  2/73   Krull et al.    204/195 P
3,718,566  2/73   Krebs           204/195 P
3,718,567  2/73   Haddad et al.   204/195 P
```

Signed and sealed this 7th day of January 1975.

(SEAL)
Attest:

McCOY M. GIBSON JR.　　　　　　C. MARSHALL DANN
Attesting Officer　　　　　　　Commissioner of Patents